(12) United States Patent  
Daoud

(10) Patent No.: US 6,488,317 B1
(45) Date of Patent: Dec. 3, 2002

(54) CABLE STRAIN RELIEF ADAPTER WITH GEL SEALING GROMMET

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/496,265

(22) Filed: Feb. 1, 2000

(51) Int. Cl.$^7$ ................................................. F16L 21/06
(52) U.S. Cl. ............. 285/322; 285/148.18; 285/148.23; 285/323; 285/345
(58) Field of Search ................................. 285/322, 323, 285/148.18, 148.23, 345

(56) References Cited

U.S. PATENT DOCUMENTS

| | | | | |
|---|---|---|---|---|
| 3,311,391 A | * | 3/1967 | Harrell | 285/323 |
| 4,083,586 A | * | 4/1978 | Helm | 285/323 |
| 4,145,075 A | * | 3/1979 | Holzmann | 285/81 |
| 4,250,348 A | * | 2/1981 | Kitagawa | 174/65 SS |
| 4,358,079 A | | 11/1982 | Navarro | |
| 4,361,721 A | | 11/1982 | Massey | |
| 4,525,000 A | | 6/1985 | Bachle | |
| 4,767,135 A | * | 8/1988 | Holzmann | 285/27 |
| 4,787,657 A | * | 11/1988 | Henniger | 285/323 |
| 4,891,470 A | | 1/1990 | Studenski | |
| 5,048,872 A | * | 9/1991 | Gehring | 285/92 |
| 5,155,303 A | | 10/1992 | Bensel, III et al. | |
| 5,350,204 A | * | 9/1994 | Henniger | 285/323 |
| 5,378,027 A | * | 1/1995 | Gehring | 285/322 |
| 5,405,172 A | * | 4/1995 | Muller, Jr. | 285/92 |
| 5,598,499 A | | 1/1997 | Burek et al. | |
| 5,600,094 A | | 2/1997 | McCabe | |
| 5,653,452 A | * | 8/1997 | Järvenkylä | 285/345 |
| 5,866,853 A | | 2/1999 | Sheehan | |

FOREIGN PATENT DOCUMENTS

| | | | | |
|---|---|---|---|---|
| DE | 0322625 A1 | * | 7/1989 | 285/322 |
| DE | 0579125 A1 | * | 1/1994 | 285/322 |
| GB | 1157600 A | * | 7/1969 | 285/322 |
| JP | 6207694 A | * | 7/1994 | 285/322 |

* cited by examiner

Primary Examiner—Robert J. Sandy
Assistant Examiner—Carlos Lugo
(74) Attorney, Agent, or Firm—Birch, Stewart, Kolasch & Birch, LLP

(57) ABSTRACT

A strain relief includes a main body having a bore therein for passage of a cable, wire, conduit, hose, or similar member therethrough. The main body includes a first section having male threads, and a second section including a plurality of cantilevered deflectable prongs extending therefrom. A plurality of slots are located between the prongs, and the prongs decrease in width extending toward distal ends of the prongs. A flexible elastomeric grommet is located within the bore and extends substantially along an entire length of the main body. The grommet includes a cylindrical sidewall and a plurality of spaced-apart annular ribs extending radially inwardly from the sidewall. A plurality of annular grooves are located between the annular ribs. The annular ribs have inside diameters which progressively increase along a length of the grommet in order to accommodate cables of various diameters therethrough. A silicone gel may be located in the annular grooves to improve the seal between the grommet and the cable. A cap is provided which includes female threads which are engagable with the male threads of the main body for securing the cap to the main body. The cap includes a conically or arcuately tapered wall engagable with distal ends of the prongs for compressing the prongs inwardly when the cap is threaded onto the main body, thereby compressing the grommet inwardly around the cable.

25 Claims, 5 Drawing Sheets

CABLE STRAIN RELIEF ADAPTER WITH GEL SEALING GROMMET

BACKGROUND OF THE INVENTION

1. Field of the Invention

The present invention relates to a strain relief for cables, conduits, optical fibers and the like, and more particularly, to a strain relief which provides a seal surrounding the cable.

2. Description of the Background Art

Strain relief connectors are known for constraining cables within the connectors. One such strain relief connector is shown in U.S. Pat. No. 4,787,657, which shows an externally threaded nipple having a plurality of deflectable prongs at one end thereof. A cylindrical seal is located interiorly of the prongs, and a cap is threaded onto the nipple over the prongs for deflecting the prongs inwardly. However, the seal is designed for one diameter of cable. Therefore, a large number of seals of different sizes must be provided in order to accommodate cable of different diameters.

There is a need in the art for a strain relief which can accommodate a wide range of cable diameters utilizing the same components, without requiring the need to produce and carry a large number of individually-sized grommets. There is a further need in the art for a strain relief which can accommodate a wide range of cable diameters while also providing an effective seal surrounding the cable.

SUMMARY OF THE INVENTION

The present invention fulfills the aforementioned need in the art by providing a strain relief including a main body, a grommet, and a cap. The main body has a bore therein for passage of a cable, wire, conduit, hose, or similar member therethrough. The main body includes a first section having male threads, and a second section including a plurality of cantilevered deflectable prongs extending therefrom. A plurality of slots are located between the prongs. The prongs decrease in width extending toward distal ends of the prongs.

The grommet is made of a flexible elastomeric material, and is located within the bore of the main body. The grommet extends substantially along an entire length of the main body. The grommet includes a cylindrical sidewall and a plurality of spaced-apart annular ribs extending radially inwardly from the sidewall. A plurality of annular grooves are located between the annular ribs. The annular is ribs have inside diameters which progressively increase along a length of the grommet in order to accommodate cables of various diameters therethrough. A silicone gel may be located in the annular grooves to improve the seal between the grommet and the cable.

The cap includes female threads which are engagable with the male threads of the main body for securing the cap to the main body. The cap further includes a tapered wall engagable with distal ends of the prongs for compressing the prongs inwardly when the cap is threaded onto the main body, thereby compressing the grommet inwardly around the cable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
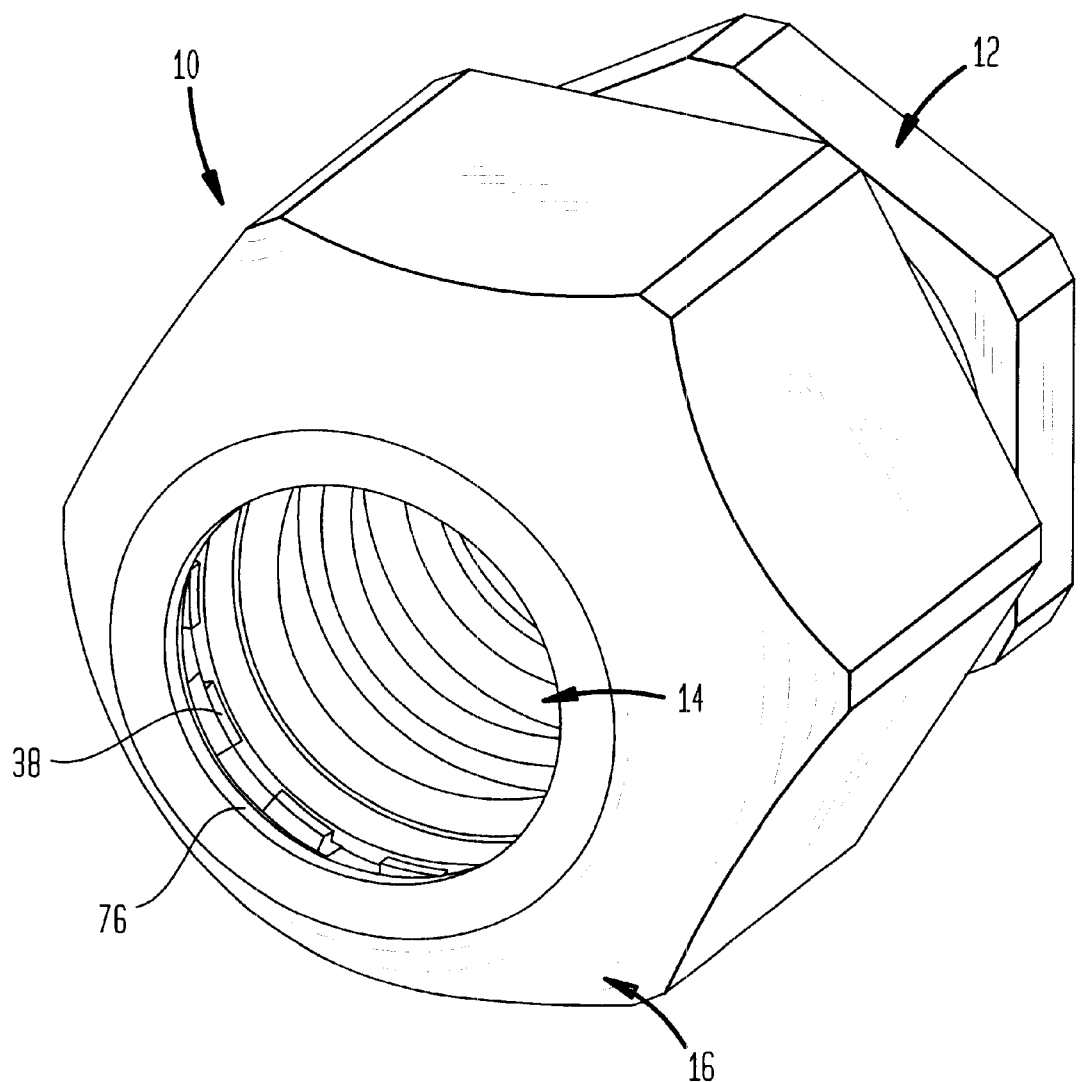
FIG. 1 is a perspective view of the strain relief of the present invention in an assembled condition.

Referring in detail to the drawings, and with particular reference to FIG. 1, a strain relief 10 of the present invention is shown. The strain relief 10 includes a main body 12, a grommet 14 located within the main body 12, and a cap 16 covering one end of the main body 12.

Figure 2:
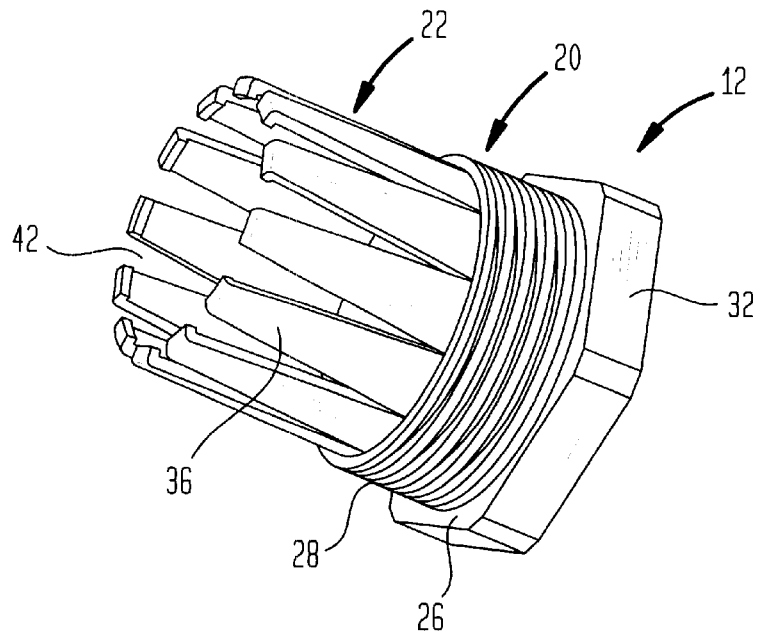
FIG. 2 is a perspective view of the main body of the strain relief.
Figure 3:
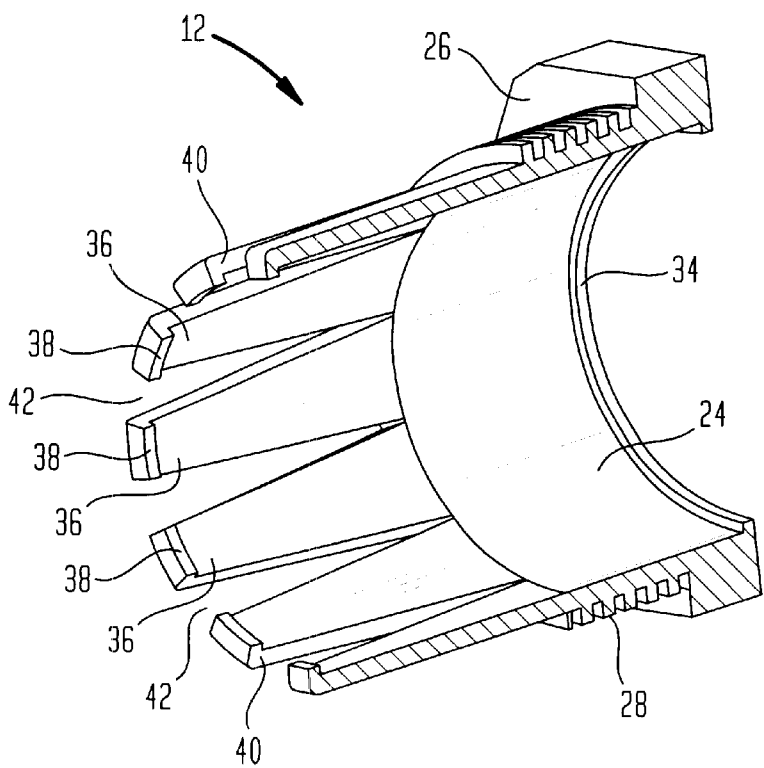
FIG. 3 is a cross-sectional perspective view of the main body.

Referring now to FIGS. 2 and 3, the main body 12 includes a first section 20 and a second section 22 having a bore 24 extending therethrough. The main body 12 may be formed of plastics or metals, such as steel or brass. The first section 20 of the main body 12 includes a flange 26 at one end thereof, and a male threaded portion 28 located between the flange 26 and the second section 22 of the main body 12. The threads 28 may be any shape, such as the square threads shown in FIGS. 2 and 3, or the 60° threads shown in FIGS. 8 and 9. The flange 26 may be a plate-like member 30, or may be formed as a tool engaging member 32, such as a square or hexagon engagable by a wrench or other tool. An inwardly extending annular shoulder 34 is located in the bore 24 adjacent one end of the first section 20 of the main body 12.

The second section 22 of the main body 12 includes a plurality of cantilevered deflectable prongs 36 extending from the first section 20 of the main body 12. The prongs 36 have inwardly extending hook members 38 at the distal ends 40 thereof. The prongs 36 decrease in width extending in a direction from the first section 20 of the main body 12 toward the distal ends 40 of the prongs 36. A plurality of slots 42 are located between the prongs 36. The slots 42 increase in width extending in a direction away from the first section 20 of the main body 12.

Figure 4:
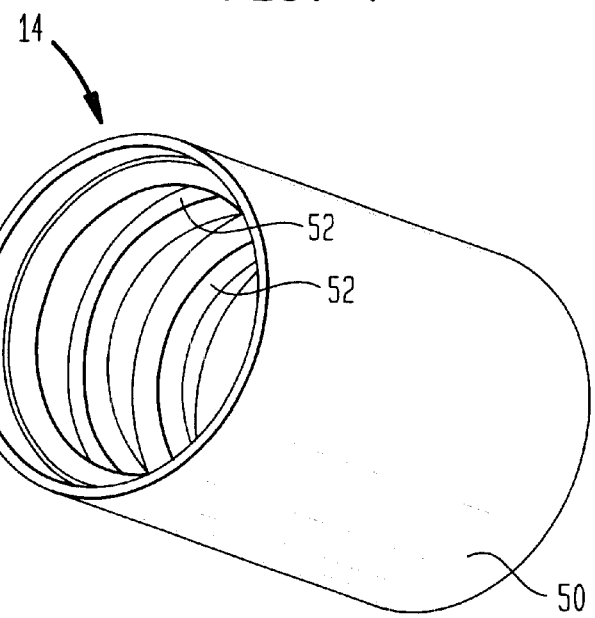
FIG. 4 is a perspective view of the grommet of the strain relief.
Figure 5:
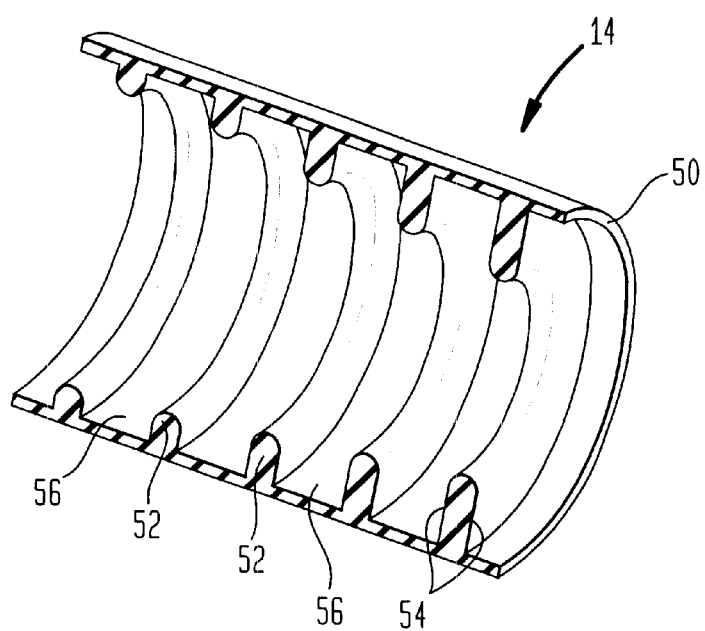
FIG. 5 is a cross-sectional perspective view of the grommet.

Referring now to FIGS. 4 and 5, the grommet 14 is located within the bore 24 and interiorly of the first and second sections 20, 22 of the main body 12. The grommet 14 preferably extends substantially along an entire length of the main body 12. The grommet 14 is preferably formed of a flexible elastomeric material such as rubber, although other deformable materials may be utilized, such as plastics.

The grommet 14 includes a cylindrical sidewall 50 and a plurality of spaced-apart annular ribs 52 extending inwardly from the sidewall 50. The annular ribs 52 preferably have inside diameters which vary along a length of the grommet 14, although it is conceivable that the grommet 14 could be formed with annular ribs 52 each having the same inside diameter. Preferably, the inside diameters progressively increase or decrease from one end of the grommet 14 to the other. More preferably, the inside diameters progressively increase in a direction toward the distal ends 40 of the prongs 36.

Each of the annular ribs 52 extends radially inwardly from the sidewall 50 and orthogonally to the sidewall 50, although it is conceivable that one or more of the annular ribs 52 could extend inwardly from the sidewall 50 at an angle other than a right angle. Also, although the annular ribs 52 of the present invention all preferably are parallel with one another, it is conceivable that one or more of the annular ribs 52 may extend from the sidewall 50 at an angle different from others of the annular ribs 52. Further, each of the annular ribs 52 includes faces 54 which are parallel to one another and orthogonal to the sidewall 50, although it is envisioned that the faces 54 could be non-parallel so as to form annular ribs 52 having a trapezoidal or other cross-section, symmetric or asymmetric.

A plurality of annular grooves 56 are located between the annular ribs 52. The annular grooves 56 have a shape and a depth which is related to the shape and size of adjacent ones of the annular ribs 52. Preferably, the depth of the annular grooves 56 progressively decreases in a direction toward the distal ends 40 of the prongs 36.

Figure 6:
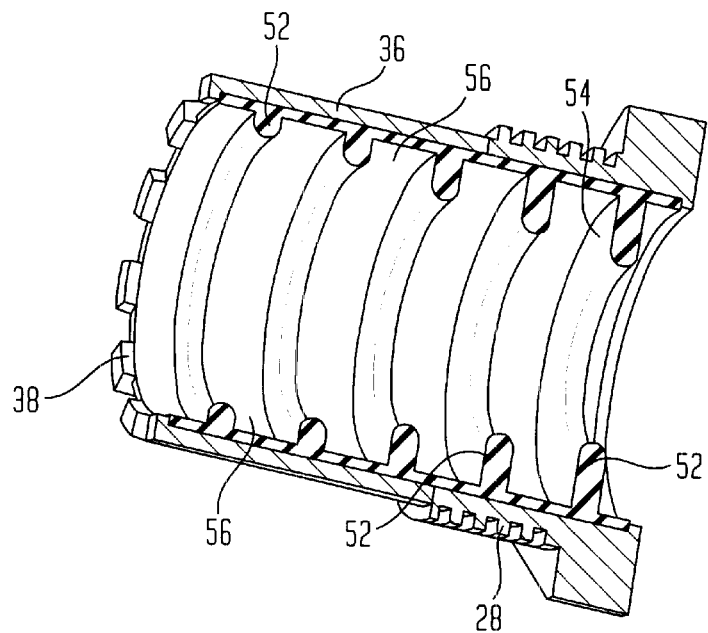
FIG. 6 is a cross-sectional view of the main body with the grommet installed therein.
Figure 7:
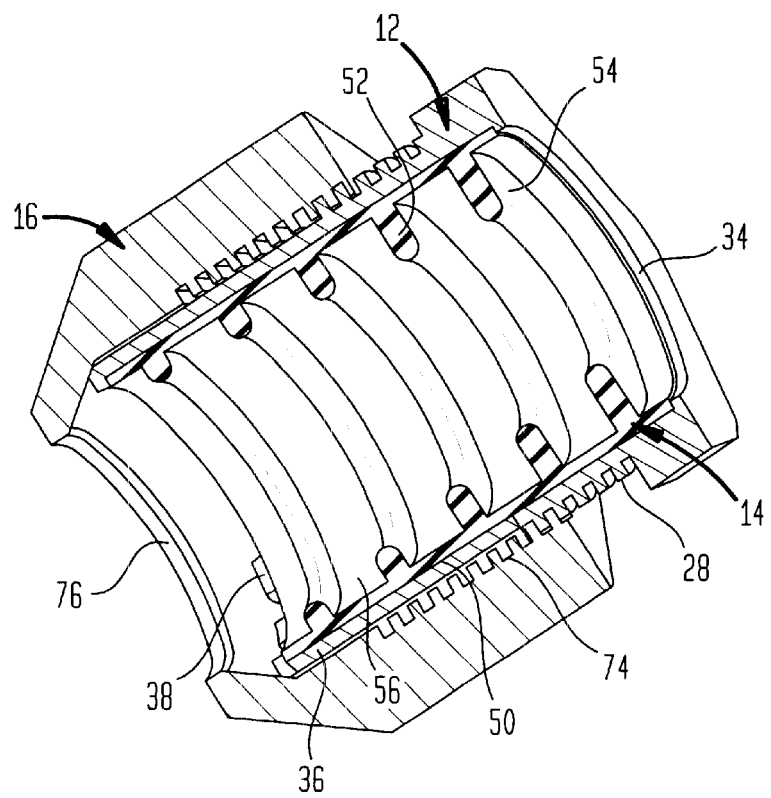
FIG. 7 is a cross-sectional perspective view of the strain relief in a partially assembled condition.

As shown in FIGS. 6 and 7, when the grommet 14 is located within the bore 24 of the main body 12, opposing ends walls of the cylindrical sidewall 50 of the grommet 14 abut the annular shoulder 34 of the first section 20 of the main body 12 and the hook members 38 of the prongs 36 so as to restrict longitudinal movement of the grommet 14. Accordingly, a cable 58 securely located within the grommet 14 is restricted from longitudinal movement as well. To increase the weather-tight capabilities of the strain relief 10, a silicone gel 60 may be located in the annular grooves 56.

Figure 8:
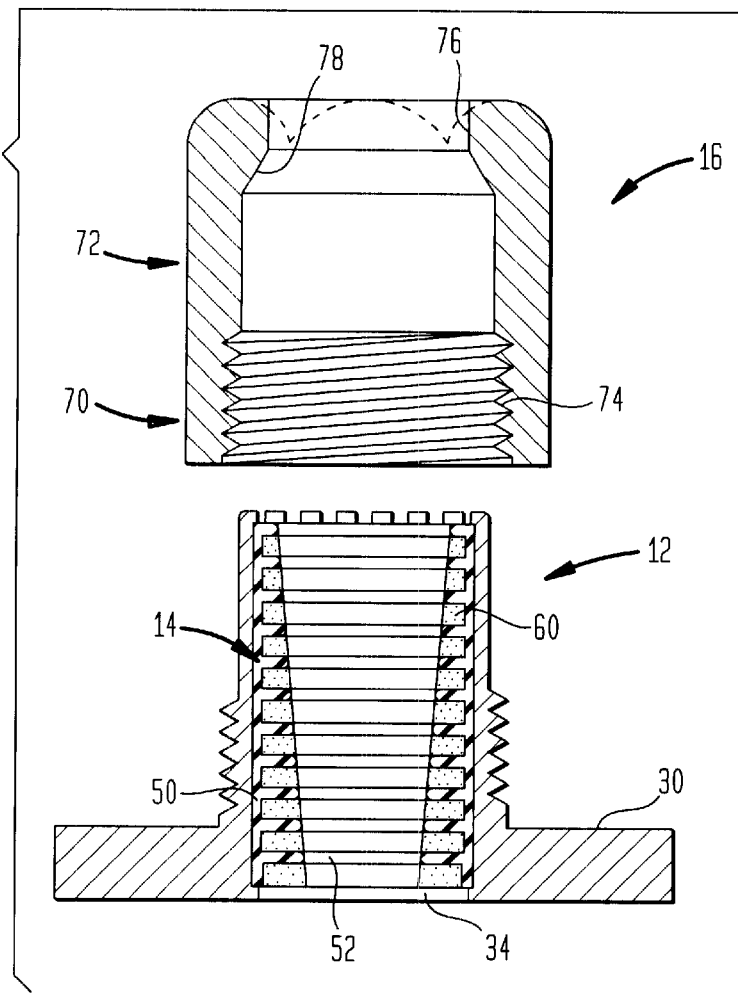
FIG. 8 is a partially exploded cross-sectional side view of the strain relief.
Figure 9:
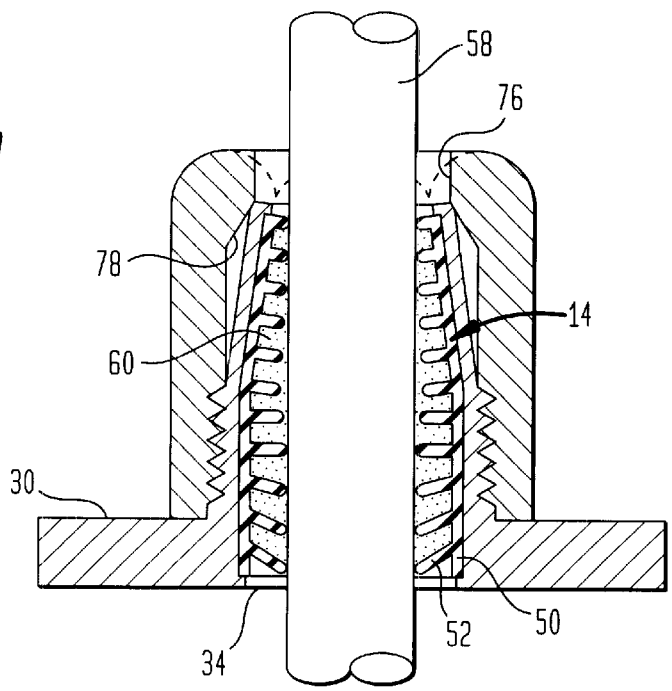
FIG. 9 is a cross-sectional side view of the strain relief in a fully assembled condition.

Referring to FIGS. 7–9, the cap 16 has a first portion 70 and a second portion 72, and may be formed of plastics or metals, such as steel or brass. The first portion 70 of the cap 16 is engagable with the first section 20 of the main body 12, and includes female threads 74 which are threadably engagable with the male threads 28 of the main body 12, for securing the cap 16 to the main body 12.

The second portion 72 of the cap 16 includes an aperture 76 for allowing a cable 58, for example, to pass freely therethrough. The second portion 72 of the cap 16 further includes a conically or arcuately tapered inner wall 78 engagable with distal ends 40 of the prongs 36 for compressing the prongs 36 radially inwardly. As the distal ends 40 of the prongs 36 move inwardly, the width of the slots 42 decreases. Also as the distal ends 40 of the prongs 36 move inwardly, the grommet 14 is compressed inwardly tightly around the cable 58.

The exterior of the cap 16 may include a hexagonal or other shape (see FIG. 1) engagable by a wrench or other tool for tightening the cap 16 onto the main body 12, or may simply includes a gripping surface, such as a knurled portion.

One method of utilizing the strain relief 10 of the present invention is to have the grommet 14 located within the bore 24 of the main body 12, and the cap 16 loosely fitted on the main body 12. The main body 12 may be secured to an enclosure. A cable 58 is passed through the grommet 14, and the cap 16 is tightened onto the main body 12. Tightening of the cap 16 forces the prongs 36 inwardly to compress the grommet 14 tightly around the cable 58.

As shown in FIG. 9, more than one of the annular ribs 52 engages the exterior of the cable 58, which further promotes a weather-tight, moisture-proof and dust-proof seal around the cable 58.

Although the invention has been described above as being used with a cable 58, it should be understood that the invention may be utilized with other elongate members, such an fiber optic cables, conduits, wires, hoses, etc.

Although male and female threads 28, 74 are shown in the preferred embodiment for securing the cap 16 to the main body 12, it is envisioned that other fastening configurations may be used, such as a cam groove and projection, or a press-snap arrangement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A strain relief comprising:
    a main body including a first section and a second section, said main body having a bore extending through said first section and said second section, said second section of said main body comprising a plurality of cantilevered deflectable prongs extending from said first section;
    a grommet located within said bore of said main body, said grommet including a cylindrical sidewall and a plurality of spaced-apart annular ribs extending inwardly from said sidewall; and
    a cap having a first portion and a second portion, said first portion of said cap engagable with said first section of said main body for securing said cap to said main body, said second portion of said cap including a tapered wall engagable with distal ends of said prongs for compressing said prongs inwardly to compress said grommet inwardly, wherein said plurality of spaced-apart annular ribs have inside diameters which progressively increase in a direction toward said distal ends of said prongs.

2. The strain relief according to claim 1, wherein said main body has an inwardly extending annular shoulder at one end of said first section.

3. The strain relief according to claim 2, wherein said prongs have inwardly extending hook members at said distal ends thereof.

4. The strain relief according to claim 3, wherein opposing ends walls of said cylindrical sidewall of said grommet abut said annular shoulder and said hook members to restrict longitudinal movement of said grommet.

5. The strain relief according to claim 1, wherein said prongs decrease in width extending in a direction from said first section of said main body toward said distal ends of said prongs.

6. The strain relief according to claim 1, wherein slots are located between said prongs, said slots increasing in width extending in a direction away from said first section of said main body.

7. The strain relief according to claim 1, wherein said first section of said main body includes male threads, and said first portion of said cap includes mating female threads.

8. The strain relief according to claim 1, wherein said grommet is formed of a flexible elastomeric material.

9. The strain relief according to claim 1, wherein said grommet extends substantially along an entire length of said main body.

10. The strain relief according to claim 1, wherein each of said annular ribs extends radially inwardly orthogonally to said sidewall.

11. The strain relief according to claim 1, wherein each of said annular ribs includes parallel faces orthogonal to said sidewall.

12. The strain relief according to claim 1, further comprising a plurality of annular grooves located between said annular ribs.

13. The strain relief according to claim 12, wherein a depth of said annular grooves decreases in a direction toward said distal ends of said prongs.

14. The strain relief according to claim 12, further comprising a gel located in said annular grooves.

15. The strain relief according to claim 1, wherein each of said annular ribs extends radially inwardly orthogonally to said sidewall, and each of said annular ribs includes parallel faces orthogonal to said sidewall.

16. The strain relief according to claim 15, further comprising a plurality of annular grooves located between said annular ribs, a depth of said annular grooves decreasing in a direction toward said distal ends of said prongs.

17. The strain relief according to claim 16, wherein said main body has an inwardly extending annular shoulder at one end of said first section, said prongs have inwardly extending hook members at said distal ends thereof, and said grommet extends substantially along an entire length of said main body such that opposing end walls of said cylindrical sidewall of said grommet abut said annular shoulder and said hook members to restrict longitudinal movement of said grommet.

18. The strain relief according to claim 17, wherein said first section of said main body includes male threads, and said first portion of said cap includes mating female threads, said prongs decrease in width extending in a direction from said first section of said main body toward said distal ends of said prongs, and slots are located between said prongs, said slots increasing in width extending in a direction away from said first section of said main body.

19. A grommet for a strain relief, said grommet comprising:

a cylindrical sidewall having a smooth outer surface;

a plurality of spaced-apart annular ribs extending inwardly from an inner surface of said sidewall, said plurality of spaced-apart annular ribs having inside diameters which progressively increase from one end to another end of said grommet; and a plurality of annular grooves located between said annular ribs.

20. The grommet according to claim 19, wherein said grommet is formed of a flexible elastomeric material.

21. The grommet according to claim 19, wherein a depth of said annular grooves decreases from said one end to said another end of said grommet.

22. The grommet according to claim 19, wherein each of said annular ribs extends radially inwardly orthogonally to said sidewall.

23. The grommet according to claim 19, wherein each of said annular ribs includes parallel faces orthogonal to said sidewall.

24. The grommet according to claim 19, wherein said grommet is formed of a flexible elastomeric material, a depth of said annular grooves decreases from said one end to said another end of said grommet, each of said annular ribs extends radially inwardly orthogonally to said sidewall, and each of said annular ribs includes parallel faces orthogonal to said sidewall.

25. A strain relief comprising:

a main body including a first section and a second section, said main body having a bore extending through said first section and said second section, said second section of said main body comprising a plurality of cantilevered deflectable prongs extending from said first section;

a grommet located within said bore and interiorly of said first section of said main body, said grommet including a cylindrical sidewall and a plurality of spaced-apart annular ribs extending inwardly from said sidewall;

a cap having a first portion and a second portion, said first portion of said cap engagable with said first section of said main body for securing said cap to said main body, said second portion of said cap including a tapered wall engagable with distal ends of said prongs for compressing said prongs inwardly to compress said grommet inwardly;

a plurality of annular grooves located between said annular ribs; and a gel located in said annular grooves.

* * * * *